United States Patent [19]

Hees

[11] Patent Number: 4,948,445
[45] Date of Patent: Aug. 14, 1990

[54] METHOD AND APPARATUS FOR MAKING A CORRUGATED FIBERBOARD HONEYCOMB STRUCTURE

[76] Inventor: Ronald D. Hees, 1757 Lakewood Dr., Rt. 7, Gaylord, Mich. 49735

[21] Appl. No.: 264,023

[22] Filed: Oct. 28, 1988

[51] Int. Cl.$^5$ ............................................. B32B 31/18
[52] U.S. Cl. ..................................... 156/196; 156/197; 156/252; 156/253; 156/257; 156/264; 156/267; 156/462; 156/469; 156/474; 156/510; 156/513; 156/516; 156/529
[58] Field of Search ............... 156/197, 252, 253, 257, 156/264, 196, 267, 462, 469, 474, 510, 516, 513, 529

[56] References Cited

U.S. PATENT DOCUMENTS

| | | | |
|---|---|---|---|
| 3,082,142 | 3/1963 | Payne et al. | 156/252 |
| 3,160,544 | 12/1964 | May et al. | 156/197 |
| 3,301,729 | 1/1967 | Kauffman | 156/252 |
| 3,483,070 | 12/1969 | Kennedy et al. | 156/197 |
| 3,733,235 | 5/1973 | De Ligt et al. | 156/264 |

Primary Examiner—Caleb Weston
Attorney, Agent, or Firm—Barnes, Kisselle, Raisch, Choate, Whittemore & Hulbert

[57] ABSTRACT

An improved method and apparatus for forming cellular core structures from corrugated fibreboard utilizing flat sheets of single wall corrugated board of rectangular configuration. The sheets are fed end one at a time in the direction of the board flutes into a rotary die cutting station to form a parallel array of evenly spaced die cut lines extending perpendicular to the flute-feed direction from one side edge to the other side edge of each sheet. Each die cut line is defined by an alternating series of very long die cuts and very short die cuts individually spaced from one another along the die cut line by very short uncut sheet material connecting portions to thereby form a plurality of strips of sheet material intermittently integrally joined by the uncut sheet material connecting portions. An array of crease lines extend parallel to the flute-feed direction and are arranged in pairs of spaced apart in the direction of the die cut lines and closely flanking each of the uncut connecting portions. Individual glue spots are applied to the outer surface of at least one of the top and bottom facings of each board sheet between selected pairs of crease lines which are to be juxtaposed to a portion of the outer surface of the facing opposite the one facing of a juxtaposed strip having no glue spot applied thereto. The sheets are then formed into honeycomb-formable strips of the sheet material by juxtaposing the face of one strip having glue spots thereon to the face of another strip having no glue spots thereon, with the glue spots of the first and second strips alternating lengthwise of the strip.

24 Claims, 7 Drawing Sheets

O = TOP GLUE SPOTS
X = BOTTOM GLUE SPOTS

METHOD AND APPARATUS FOR MAKING A CORRUGATED FIBERBOARD HONEYCOMB STRUCTURE

FIELD OF THE INVENTION

This invention relates to cellular core structures made from sheet material for use as filler reinforcement material in laminated panels and the like, and more particularly to a honeycomb structure made from a sheet of corrugated fibreboard or the like, and to a method and apparatus for making the same.

BACKGROUND

For many years the general geometric structure of the "HONEYCOMB" cell has been known and applied in various applications and for various purposes. More particularly, honeycomb cellular core structures of corrugated fibreboard are known and find wide utility in modern industry. For example, corrugated fiber board honeycomb is used as the core material in sandwich type construction typically used to produce items such as hollow core flush doors, interior portable wall partitions, and the like.

One method of manufacturing such materials developed during the 1960's, and still in use today, involved laying up a series of flat sheets with alternate solid lines of glue, compressing and drying the stack thus formed, and then cutting the entire pile into strips to the desired thickness. When the strips were then pulled from the opposite sides of the stack, the honeycomb pattern emerged. One example of this prior art method is that disclosed in U.S. Kauffman Pat. No. 3,301,729. In the Kauffman patent the cellular core structures of corrugated fibreboard comprise a plurality of strips of the material superimposed to form a stack, with spaced areas of adjacent strips being glued or otherwise adhered together. The adhered areas between one strip and adjacent strip are spaced apart along the length of the strips, and the adhered areas between that one strip and an adjacent strip on the other side thereof are intermediate the first mentioned areas so that the stack can then be expanded to define a cellular core structure to which several face sheets may be adhered, all in well known manner.

However, the Kauffman '729 patent method has several following shortcomings:
1. The kerf of any saw blade used to cut the stack into strips of desired thickness creates substantial amounts of dust which is pure wasted material.
2. The paper dust created by such sawing is hard to control and creates potential health and disposal difficulties.
3. Excessive paper dust in the corrugated flutes of the finished product is objectionable to the user, creating problems in subsequent assembly operations.
4. Glue lines formed by the glue stripping rolls are hard to control and often irregular in width; too wide a glue line restricts the expansion of the honeycomb cell, requiring more fiberboard to begin with, and less-even distribution of the core within the users' product.
5. The method involves the separate operations of lay-up, compression and cutting, a rather labor intensive process which also requires the handling and "staging" of the product in various forms as it proceeds through the production area.

Another prior art approach to making honeycomb structure as core material for building panels, doors, table tops, etc. as an interior reinforcing core material, in a continuous process including a star folding operation, is exemplified in the varying approaches taught in the prior art U.S. Pat. No. to Payne et al 3,082,142 and Lincoln et al 2,553,054; and in the series of U.S. Pat. Nos. to Geschwender 3,218,217; 3,528,334; 3,587,479; 3,607,583; 3,684,618; and 3,887,419. However, these various prior art approaches to continuous production of honeycomb material all involved the use of flexible material (such as heavy paper) which can be and was web fed in continuous form, and such approaches cannot be employed with sheet material such as corrugated fibreboard. In those prior art approaches, which proposed employing rotary die cutting, the "state-of-the-art" in die cutting had not progressed to the point wherein a quality product could be produced from commercially available rotary die cutting equipment once the necessary "tie-in" equipment to handle the sheet had been developed.

Other prior art patents of general interest to the present invention include the following U.S. Pat. Nos.:
 1,455,061 Barrett
 2,537,026 Brugger
 2,581,421 Lombard et al
 3,810,800 Doll However, through the years, both die cutting equipment and techniques have improved to the point where, in accordance with the present invention, and through the combined use of standard equipment and specially designed material handling equipment, as well as improvements in die cut and glue patterns, an improved process and apparatus has been developed in accordance with the present invention for producing corrugated fibreboard honeycomb which essentially solves the aforementioned objections.

FEATURES OF THE INVENTION

The present invention in one aspect contemplates a novel intermediate product, and improvements in method and apparatus for practicing certain aspects of the aforementioned method of the Kauffman U.S. Pat. No. 3,301,729 (which is incorporated herein by reference), but which overcomes one or more of the several shortcomings enumerated above relative to the Kauffman '729 patent method.

In another aspect of the present invention, and also involving a rotary die cutting apparatus and step, the corrugated fibreboard, after being die cut to form a novel intermediate product, proceeds through a special gluing machine station wherein glue is spot applied on opposite sides of the facing sheets of the paper board in a manner so that, when the entire piece is star folded in a subsequent station, the sheet is glued together at those specific glue spots, thereby causing the honeycomb pattern to develop in the final product. Downstream from the gluing station, the sheet is folded in the star folder and compressed in an specially designed belt compression unit. After leaving the compression unit the pieces are surfaced on both sides in a single pass through an abrasive surfacing machine, and are then ready for shipment to the customer as completed but unexpanded corrugated fibreboard honeycomb product.

In both embodiments the sheet is also creased in the die cutting station in a double pattern next to each glue spot. This causes the honeycomb to break evenly when expanded to give more complete expansion and more uniform cell sizes, both features being advantageous to the end user. In both embodiments, printing the glue on each "spot" further reduces the amount of fiber board needed to fill a given void size, and less adhesive is also required.

OBJECTS OF THE INVENTION

Accordingly, among the objects of the present invention are to:
1. Reduce the amount of material initially required by providing for narrower joints and pre-creased cell corners as well as eliminating the end tabs of the Kauffman Patent which were required to hold the sheet together during the die cutting process.
2. Create more uniform cell sizes by use of printing small "glue" spots and creasing the cell corners.
3. Eliminate paper dust and excessive waste through the die cutting process.
4. Reduction of labor costs through the elimination of several handling steps employed in previous methods.
5. Provide a process designed to handle the radically die cut intermediate product sheet which would be difficult, if not impossible, to handle without the "in-line" process and the specially designed "tie-in" equipment.

Other objects, features and advantages of the present invention will become apparent from the following detailed description and appended claims, taken in conjunction with the accompanying drawings, wherein:

DETAILED DESCRIPTION

Definitions

As set forth in the 18the Edition of the *Fibre Box Handbook*, copyright 1987, Fibre Box Association, 87225 Higgins Road, Chicago, IL. 60631, the following industry definitions are, among others, also employed herein: "Corrugated board—single wall"; also known as "Double Face". The structure formed by one corrugated inner member glued between two flat facings. "Corrugating material or corrugating medium"; Paper board used in forming the fluted portion of the corrugated board. "Die-Cut"; A cut made with special steel rule dies. The act of making a part or container which is cut and scored to shape by such tools. Also used to denote a board which has been die-cut. "Facings"; (sometimes erroneously called liners.) A form of linerboard used as the flat members of corrugated fibreboard. "Fibreboard"; A general term applied to fabricated paperboard utilized in container manufacture. May be of either corrugated or solid construction. "Flute or Corrugation"; One of the wave shapes in the inner portion of combined corrugated fibreboard. The flutes most commonly used are: A-flute, 33+/−3 flutes per linear foot, approximate height 3/16"; B-flute, 47+/−3 flutes per linear foot, approximate height 3/32"; C-flute, 39+/−3 flutes per linear foot, approximate height 9/64"; E-flute, 90+/−4 flutes per linear foot, approximate height 3/64" (above heights do not include thickness of facings). "Linerboard"; Paperboard used for the flat facings in corrugated fibreboard; also as the outer plies of solid fibreboard. "Paperboard"; The broad classification of materials made of cellulosic fibres on board machines, encompassing for fibreboard: liner board, corrugating medium and the plies of solid fibreboard. Most commonly made from wood pulp or paper stock. "Score"; An impression or crease in corrugated or solid fibreboard to locate and facilitate folding. "Slit"; A cut made in fibreboard sheet without removal of material. "Slit-Score"; A cut made in a fibreboard sheet extending through only a portion of the thickness. "Slot"; a cut made in a fibreboard sheet, usually to form flaps and thus permit folding. Widths of ¼" and ⅜" are common.

Sheet Feeding Step and Station

Figure 1:
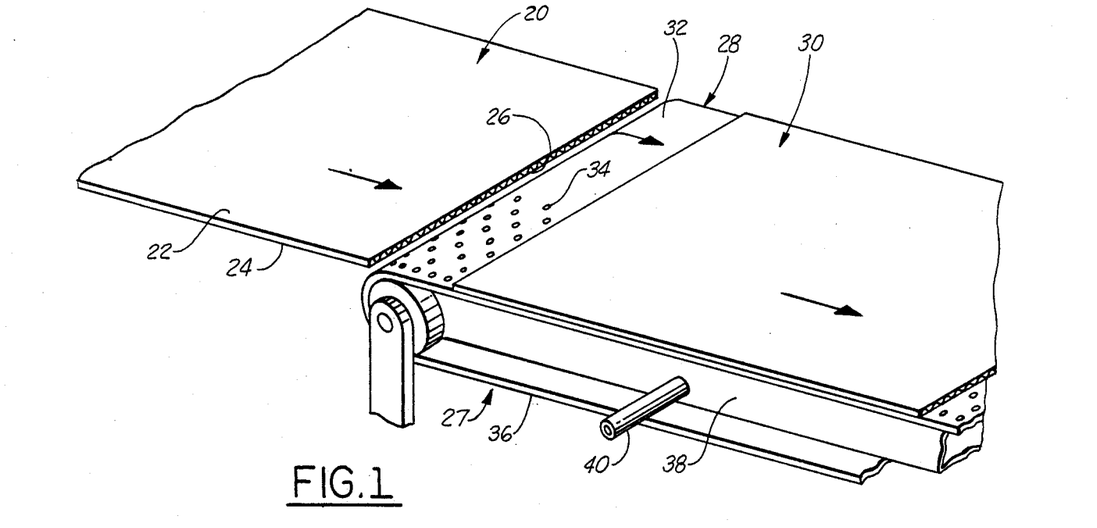
FIG. 1 is a fragmentary, simplified and semi-schematic perspective view of a first step and station in a first embodiment of the method and apparatus of the present invention in which a supply of starting material is fed one sheet at a time to a second, rotary die cutting station shown in FIG. 2.

Referring in more detail to the accompanying drawings, FIG. 1 illustrates an exemplarary but preferred first step and station, employed in both the first and second embodiments of the invention illustrated herein, for providing a supply of the starting material employed in making honeycomb filler cellular core structure in accordance with the present invention. A supply of the starting material is provided preferably in the form of a stack of corrugated fibreboard rigid sheet material fed from a commercially available sheet feeder of either the kick, suction or cog belt variety. The starting material may be commercially produced corrugated fibreboard of any desired flute and/or liner board weight, or similar sheet material. As indicated above under "Definitions", the term "corrugated fibreboard" or "corrugated board" has reference to the well known, commercially available material comprising, as shown fragmentarily in FIG. 1, a single sheet of single wall (also known as "double face") corrugated fibreboard 20 comprising continuous flat facing sheets 22 and 24 of paper or the like embracing and adhered by glue to the top and bottom crowns 26a and 26b (FIG. 7) of the flutes of the sheet of corrugated paper 26 therebetween.

Figure 2:
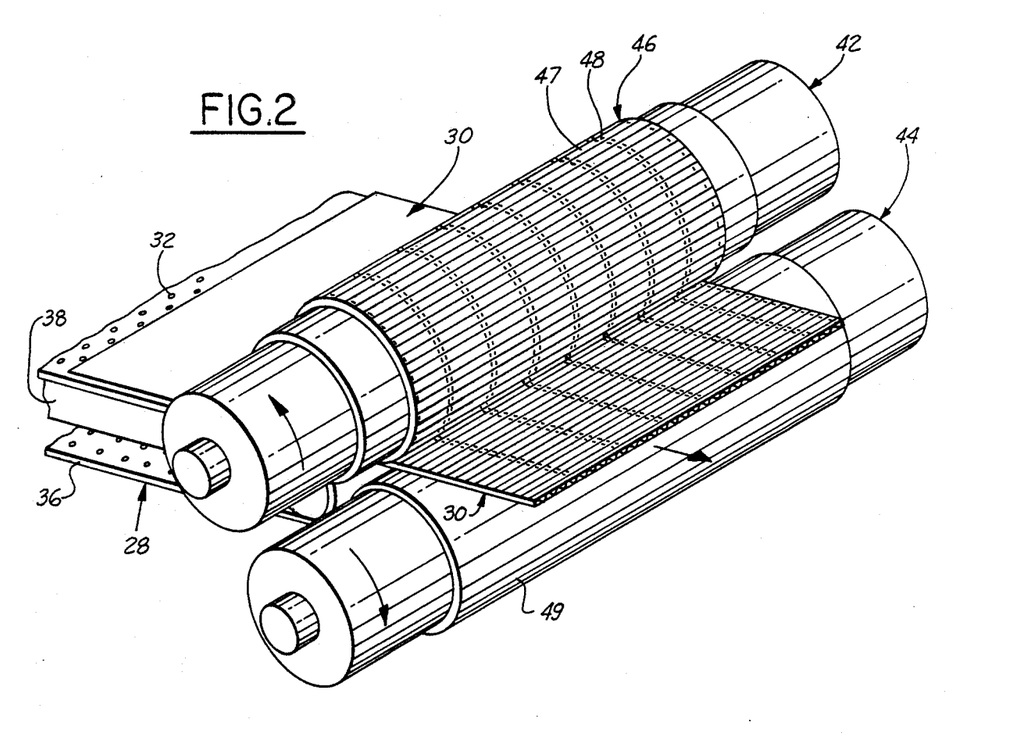
FIG. 2 is a fragmentary, semi-schematic and simplified perspective view of the second step and station of the method and apparatus of the first embodiment of the invention in which a rotary die cutting operation is performed on the sheet material.

Sheets 20 are thus fed one at a time (horizontally as illustrated herein) from a suitable supply stack (not shown) edge wise either kick-fed or suction fed onto a suitably constructed conveyor 27 having an endless belt 28 adapted to feed the sheets into the rotary die cutting station of FIG. 2. In FIG. 1 sheet 20 is shown in position, as either the top or bottom sheet of a subjacent or superposed stack-up in a sheet feeder, ready to be advanced from the stack-up onto the upper run 32 of belt 28 of the conveyor mechanism 27 in the suction feed method.

As illustrated in FIGS. 1 and 2, conveyor belt 28 has a uniform pattern of perforations 34 extending continuously throughout the upper and lower runs 32 and 36 thereof and an interposed vacuum chamber 38 coupled via a conduit 40 to a suitable vacuum source. Thus, as shown in FIG. 1, conveyor belt 28 is shown firmly vacuum clamping a sheet 30, identical to sheet 20 and feeding the same in the direction of the arrows in FIGS. 1 and 2 into a rotary die cutting station shown in FIG. 2. Alternatively, as previously mentioned, the sheets may also be individually kicker-fed through the use of commercially available kicker feeding systems.

Rotary Die Cutting Step and Station

The die cutting station may be provided with a commercially available rotary die cutting press, such as the Ward rotary die cutter manufactured by Ward Machinery Company of Baltimore, MD. The rotary die cutter station thus has a top roll 42 and a bottom roll 44 aligned with the output end of conveyor 28 so that sheet 30 is fed between the rolls at a predetermined feed synchronized with the operation of the rotary die cutter. Top roll 42 carries an especially designed rotary cutting die 46 which conventionally consists of a plywood interior board curved into a half-cylinder and bolted to mounting holes in top roll 42. The plywood carrier is provided with suitable slits into which appropriate and/or commercially available "rules" (cutting, slitting, creasing or scoring, slitscoring, perforating knives, etc.) 47, 48 are mounted. The carrier board also has hard rubber material disposed between these rules which is compressed during the cutting action and which, after squeeze pressure is released as sheet 30 emerges from between top and bottom rolls 42 and 44, will by its resilience push the fibreboard sheet 30 off of the rules 47, 48. Bottom roll 44 carries a smooth hard rubber facing cylinder 49 to provide back-up to the cutting action of rules of the top roll.

Figure 3:
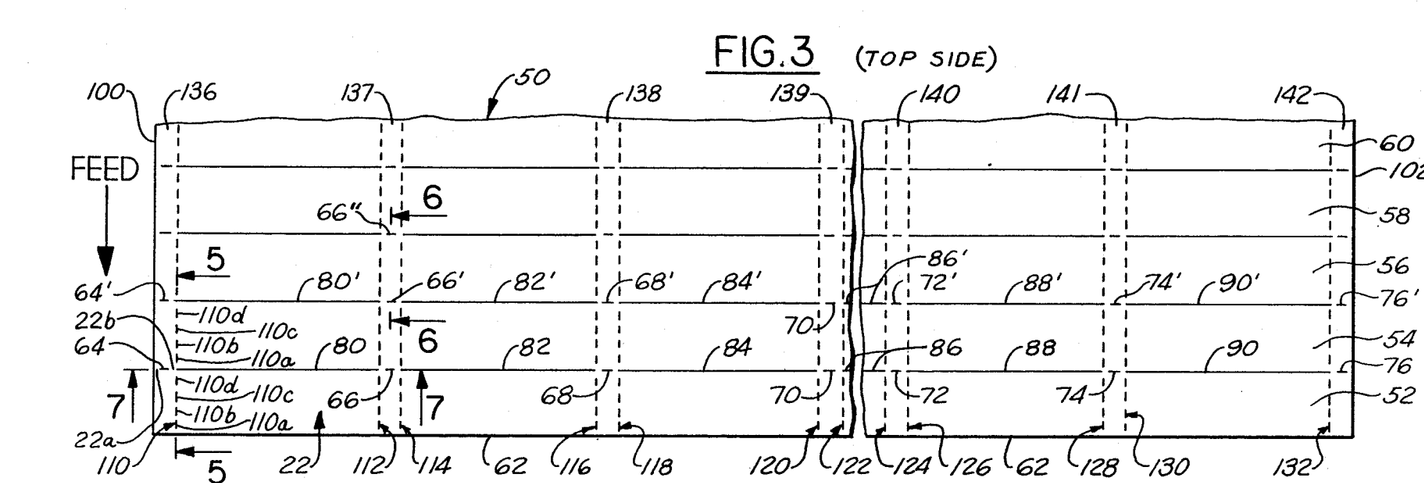
FIG. 3 is a fragmentary top plan view of a leading portion of a sheet of the material in the form of an intermediate product as it emerges from the rotary die cutting station of FIG. 2 and embodying a predetermined die cut slit and crease pattern therein.
Figure 4:
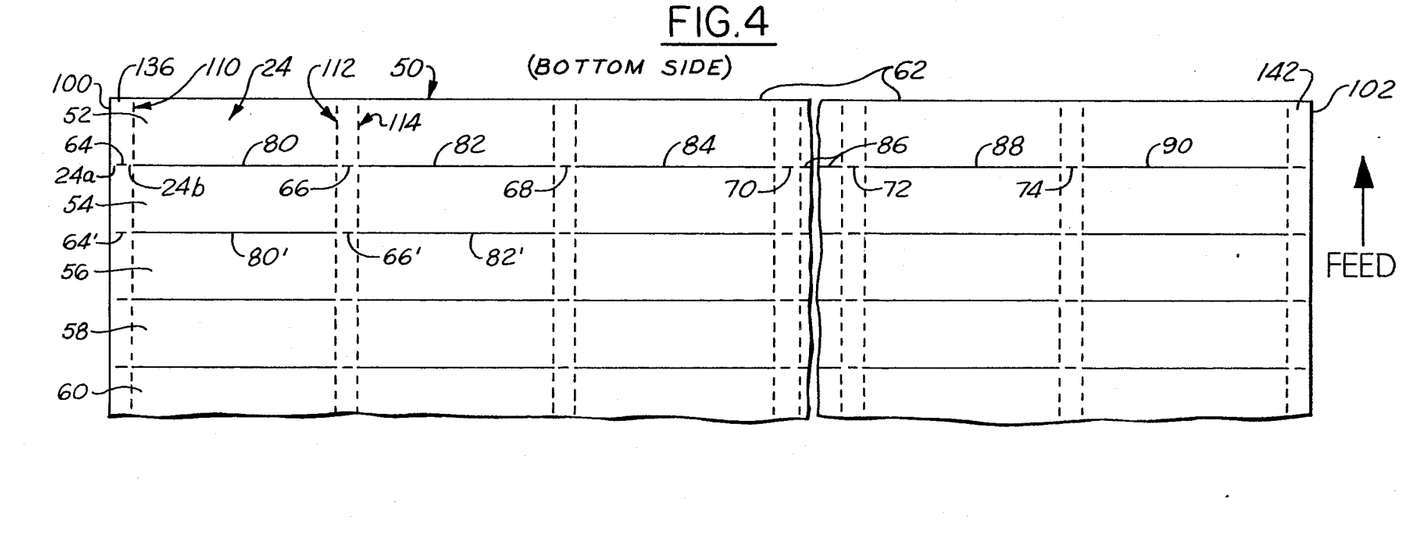
FIG. 4 is a fragmentary bottom plan view of the portion of the sheet material illustrated in FIG. 3.
Figure 5:
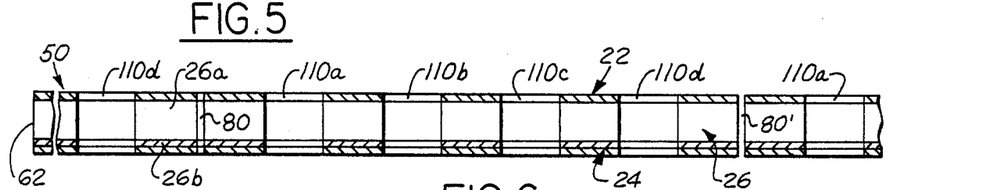
FIGS. 5, 6 and 7 are fragmentary vertical cross-sectional views respectively taken on the lines 5—5, 6—6 and 7—7 of FIG. 3 but greatly enlarged thereover, and represent somewhat schematically idealized straight-line cuts to simplify understanding.
Figures 6, 7:
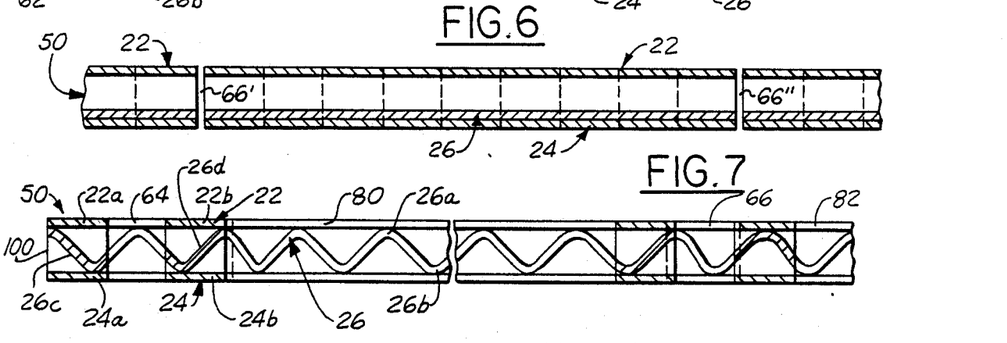

In accordance with one feature of the present invention, the rule set-up of rotary die cutter 46 is arranged in a precise predetermined pattern to produce a slit and crease pattern in sheet 30 to convert the same into a novel intermediate product sheet 50 as shown in FIGS. 3 through 7. As indicated in FIG. 3, sheet 50 is cut at regular intervals along each of a plurality of regularly spaced rows of strip portions 52, 54, 56, 58, 60, etc. which extend transversely of sheet 50 parallel to the leading edge 62 of sheet 50 and perpendicular to the direction of sheet feed and to the longitudinal direction of the corrugated paper 26, i.e., perpendicular to the top and bottom ridge lines of crowns 26a and 26b of the flutes of corrugated paper 26 as shown in FIG. 7. Thus, between strip portions 52 and 54 the rules produce an interrupted first cut line made up of very short perforated slit-scores 64, 66, 68, 70, 72, 74, and 76 which alternate with relatively long throughcuts or slits 80, 82, 84, 86, 88, and 90. Likewise between strip portions 54 and 56 the rules cut a second interrupted cut line made up of the very short perforated slit-scores 64', 66', 68', 70', 72', 74', and 76' which alternate with the relatively long through-cut or slits 80', 82', 84', 86', 88', and 90' respectively identical to the short and long slits 64–90 of the first cut row. The same short-long slit pattern is identically repeated between the successive rows 56–58, 58–60, etc.

As will be seen from the bottom side view of FIG. 4, and from the greatly enlarged cross-sectional view of FIG. 7, each short-long transverse cut line 64–90 extends depthwise all the way through sheet 50 so that both the top and bottom face sheets 22 and 24 as well as the corrugated paper 26 therebetween is cut by the associated die cutter rule in making each of the long cuts 80–90.

After sheet 50 is so rotary die cut, the same is longitudinally held together between its longitudinal side edges 100 and 102 by relatively small longitudinally interconnecting portions remaining between the short and long transverse cuts 64–76 and 80–90. Thus, as seen in FIGS. 3, 4 and 7, between the short perforated slit-score 64 and the sheet side edge 100 the longitudinal interconnecting portion structure consists of a portion 22a of top sheet 22, a similar portion 24a of bottom sheet 24 and the interposed portion 26c of the associated flute of the sheet of corrugated paper 26. Similarly, between short perforated slit-score 64 and long slit 80, the longitudinal interconnecting structure consists of the portion 22b of top paper sheet 22, portion 24b of bottom paper sheet 24 and the associated flute portion 26d of the corrugated paper sheet 26. This same longitudinal interconnecting structure is repeated transversely across sheet 50 between long slit 80 and the next short perforated slit-score 66, between short perforated slit-score 66 and long slit 82, etc.

It will be noted that although the dimension of each of these longitudinal interconnecting portions transversely of sheet 50 is quite small, they nevertheless possess relatively high tensil strength resisting separation of the rows 52, 54, 56, etc. during sheet feed due to the corrugated paper 26 being arranged with its ridge lines extending longitudinally of sheet 50 in the direction of sheet feed, and because the longitudinally interconnecting portions after slitting provide a beam section modulus with either a crown 26a or 26b of the corrugation 26 disposed therein and adhered to the associated top or bottom sheets 22 and 24.

Although the idealized cross section of FIG. 7 shows straight line edges of the cuts perpendicular to the plane of the face sheets, in actual practice, since the short cuts 64–70 of cut line 64–90 are preferably made in the form of perforated slit-scores rather than through-cut slits, a tropezordal wedgelike cut will be made by the associated portion of the die cutting rule. The teeth of the rule will only partially penetrate bottom face sheet 24 such that the teeth tips produce an interrupted perforation cut therein between uncut bottom face portions 24a and 24b. Hence, there is a further longitudinal interconnection provided in the bottom face 24 by the uncut material remaining in this portion of the perforated slit-score puncture.

However, as a less-preferred alternative, short cuts 64–76 may be formed as through-cut slits more closely approaching in appearance the idealized cross section of FIG. 7.

In the rotary die cutting step and station the uncut sheet 30 is further die cut to produce a series of longitudinally extending fold-assisting crease rows 110, 112, 114, 116, 118, 120, 122, 124, 126, 128, 130, and 132 (FIGS. 3, 4 and 5). Each of these longitudinally extending crease rows 110, 112, etc. preferably consists of a series of, for example, four equally spaced short perforated slit-scores 110a, 110b, 110c, and 110d (FIG. 3) disposed in strip 52 between and perpendicular to leading edge 62 and the transverse slit row 64–90. Likewise, the portion of row 110 in transverse strip 54 of sheet 50 contains another such perforated slit-score arrangement 110a–110d. The perforated slit-scores of each row 110, 112 may extend all the way through sheet 50 so that the top and bottom face sheets 22 and 24 as well as the interposed corrugated sheet 26 is cut at each slit 110a, 110b, etc. Alternatively, as the crease rows 110–132 may be formed as a simple crease by employing appropriate commercially available rotary creasing rules, such as those marketed by the National Steel Rule Company of Linden, NJ.

The spacing between the longitudinal crease row 110 and side edge 100 is sufficient to contain one or more short transverse slits 64, and the flanking longitudinally interconnecting portions 22a, 24a, 26c and 22b, 24b and 26d. Similarly, the spacing between longitudinally extending crease rows 112 and 114 encompasses one or more short slits 66 and the associated flanking longitudinally interconnecting portions. This pattern is repeated for the remaining arrangement of longitudinally extending crease rows 116–132.

It will be noted that the above described transverse and longitudinal die cut slit and crease pattern imparted to sheet 50 may be held to relatively precise dimensions, as well as parallelism and perpendicularity, relative to the peripheral edges of sheet 50 due to the accuracy and precision available in the set up and operation of the rotary die cutter mechanism 42–46 of the rotary die cutting station shown in FIG. 2. This also enables the amount of paper material forming the longitudinally interconnecting portions 22a, 24a and 26c to have a very small dimension transversely of sheet 50. This feature also enables the manufacturer to vary the characteristics (height, number of ply, length, cell size, glue joint size, etc.) of the final honeycomb pattern to suite customer specifications, holding precise dimensions, as long as the overall sheet size 30 required is within the capacity of the die cutting machine.

For example, in one working embodiment the following dimensions were obtained with relatively close tolerances:

| | |
|---|---|
| Overall length of sheet 50 | approx. 45" |
| Overall width of sheet 50 (in Leed direction) | approx. 37" |
| Total thickness of sheet 50 | approx. ⅛" |
| Lengthwise dimension of short slit 64, 66, etc. transversely of sheet 50 | approx. 1/16" |
| Length of long transverse slits 80, 82, etc. transversely of sheet 50 | approx. 9" |
| Length of longitudinally interconnecting portions 22a, 24a, 26c transversely of sheet 50 | approx. 1/16" |
| Length of slots 110a, 110b, etc. longitudinally of sheet 50 | approx. ⅛" |
| Number of top and bottom crowns 26A and 26b per inch of corrugated sheet 26 | B-flute spec. |
| Thickness of top and bottom paper face sheets 22 and 24 | approx. 1/64" |
| Thickness of corrugated paper 26 | approx. 3/32" |
| Material of sheets 22, 24 and 26 | 26 Lbs. Kraft liner board 100 sq./ft. |

Glue Application Step and Station

Figure 8:
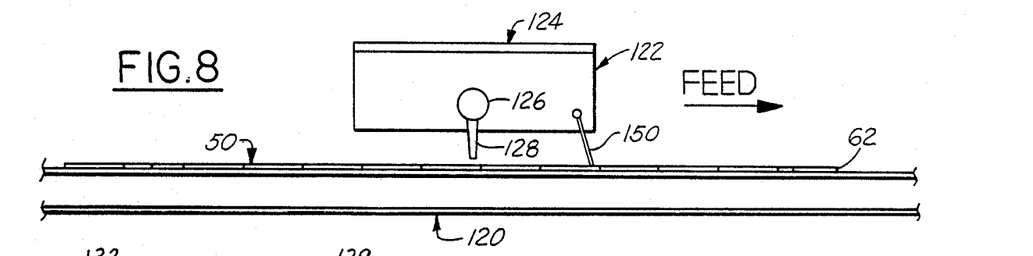
FIG. 8 is a fragmentary, simplified and semi-schematic side elevational view of a third step and station in the method and apparatus of the first embodiment of the invention in which a predetermined glue spot pattern is applied to the upper surface of the sheet material fed into the glue station from the rotary die cutting station of FIG. 2.

After each completely die cut sheet 50 emerges from the rotary die cutting station of FIG. 2, the same is fed one at a time onto a conveyor 120 (FIG. 8), which may be similar to conveyor 28, where sheet 50 is advanced toward the right as viewed in FIG. 8 at a uniform rate. Again, each sheet 50 is advanced with its transverse rows 52, 54, etc. perpendicular to the direction of sheet feed, and thus the ridges of the corrugated paper 26 extend parallel to the direction of feed on conveyor 120. Conveyor 120 is operated at uniform rate of speed to advance each sheet 50 below to a conventional spot gluing apparatus 122 similar to that disclosed in the aforementioned Kauffman '729 patent. Gluer 122 is thus provided with a suitable housing 124 wherein a supply of an appropriate adhesive material is kept at the desired temperature in a liquid state, and which includes suitable pumping or pressurizing means to force the adhesive through a manifold 126 extending transversely across the upper run of conveyor 120. Communicating with manifold 126 are a plurality of nozzles 128 directed downwardly directly over the sheet 50 passing therebeneath. The row of nozzles 128 are spaced apart for alignment with the center of every other one of a series of longitudinally extending contact strip portions 136, 137, 138, 139, 140, 141 and 142 respectively formed in sheet 50 (FIG. 3) transversely between edge 100 and crease row 110 and between longitudinal crease pairs of similar rows 112-114, 116-118, 120-122, 124-126, 128-30, and between row 132 and the opposite side edge 102 of sheet 50. A suitable feeler mechanism 150 (FIG. 8) detects the leading edge 62 of each sheet 50 and initiates a cycle of operation of the glue mechanism 122. Suitable timing and cycling means are provided, not shown, whereby advancing sheet 50 initiates a cycle wherein the nozzles 128 will deposit a precise spot of glue centered in every other one of the longitudinal contact rows 136–142 and aligned with the longitudinal center line of each transverse strip 52–60.

Figure 9:
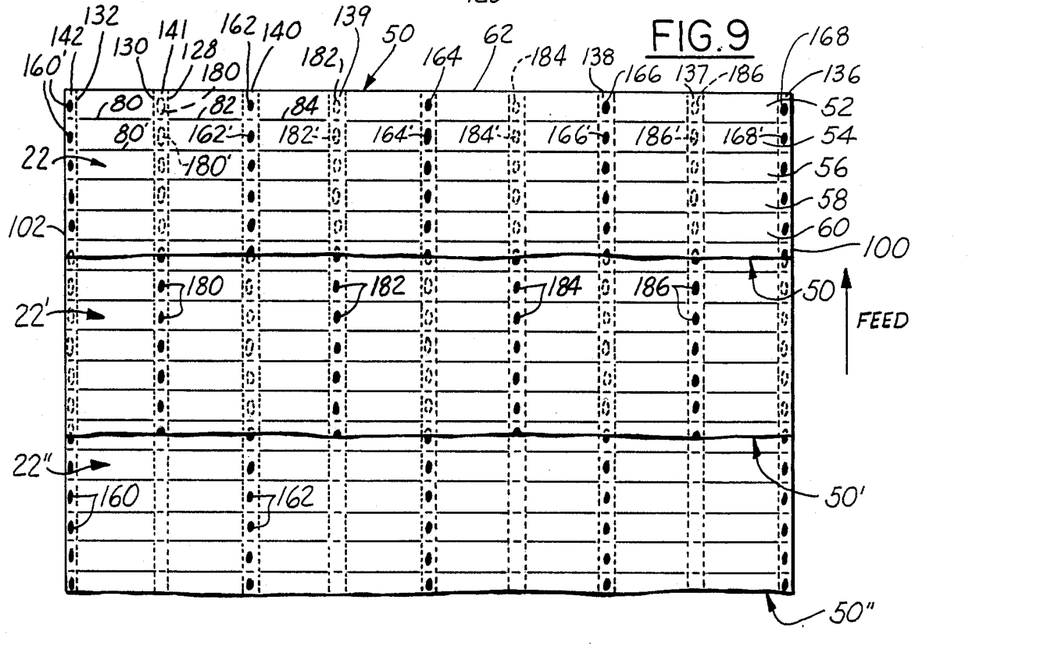
FIG. 9 is a fragmentary top plan view of a three sheet layer of the sheet material after the same has emerged from the gluing station and has been arranged with the sheets superposed in a stacked array in the stacking and shearing step and station of FIG. 10, the three superposed sheets being progressively broken away to successively reveal the subjacent sheet as viewed from the top side thereof.

The spot glue pattern for sheet 50 is best seen in FIG. 9, which is a fragmentary top plan view of a three sheet layer of three cut sheets 50 after the same have emerged from the gluing station and have been arranged with the sheets superposed in a stacked array. These three superposed sheets are shown progressively broken away to successively reveal the subjacent sheet as viewed from the top side thereof (and with the sheets rotated in the plane of the drawing 180° relative to FIG. 3). It will be seen that the first transverse strip 52 will have glue spots 160, 162, 164, 166 and 168 (shown as solid dots) applied thereto on the upper surface of top sheet 22 which are laterally centered respectively in alternate longitudinal contact strips 142, 140, etc. Thus the intervening longitudinal contact strips 141, 139, etc. do not have any glue spot applied thereto in strip 52. Glue spots 160–168 are also centered laterally of both transverse strip 52 and contact strips 142, 140, etc.

After glue spots 160–168 are applied by nozzles 128 to row 52, the cycle and timing mechanism of gluer 122 will cause a second transverse row of glue spots to be applied to the next successive strip 54 in the advance of sheet 50, whereby another transverse row of glue spots 160, 162, 164, 166 and 168 are applied to strip 54 in a pattern identical that on the preceding strip 52 i.e. centered in alternate longitudinal contact strips 142, 140, etc. This glue spot pattern is repeated for each successive transverse strip 56, 58, 60, etc. throughout strip 50 until the same emerges from the glue station.

When the feeler 150 of glue mechanism 122 detects the leading edge 62 of the next succeeding sheet 50 fed into the glue station, it initiates a cycle of operation wherein the nozzles 128 deposit a spot of adhesive centered in alternate contact strip rows 141, 139, etc. but again on each transverse strip 52, 54, 56, etc. to create a longitudinally extending row of glue spots 180 on contact strip 141, another longitudinal row of glue spots 182 on contact strip 139 etc. to form the longitudinally extending (i.e., in the direction of sheet feed) rows of glue spots 180, 182, 184 and 186. This second sheet passing through the gluing station of FIG. 8 is indicated as the middle sheet 50' in the three sheet stack-up of FIG. 9. Hence the glue spots applied thereto are shown in solid circles in FIG. 9 on the exposed portion of second sheet 50'. Note that the glue spots on sheet 50' are staggered laterally from the glue spots on sheet 50 superposed thereto. When the next successive (third) sheet 50 reaches the feeler 150 of the glue mechanism 122, it initiates a cycle identical to that employed with the first sheet 50.

These three successive sheets with glue applied thereto are shown in FIG. 9 as a three sheet stack-up with the first sheet 50 shown fragmentarily on top and broken away to reveal the second sheet 50', which in turn is broken away to reveal the bottom sheet 50" which is the third sheet fed through the glue station as described above. Note that glue patterns applied to alternately fed first and third sheets 50 and 50" are identical and are laterally staggered relative to the intermediate second sheet 50'. Preferably, a relatively small spot of adhesive is applied in each area, of less width (diameter) than the transverse strips 52, 54, etc. and of less width than the longitudinally extending strips 142, 140, 138, etc. It is also to be noted that in this first embodiment, such glue spots are only applied to the one side of each sheet 50, 50', 50", etc., namely onto top facing 22 of each sheet 50 processed through the gluing station.

Stacking and Shearing Step and Station

Figure 10:
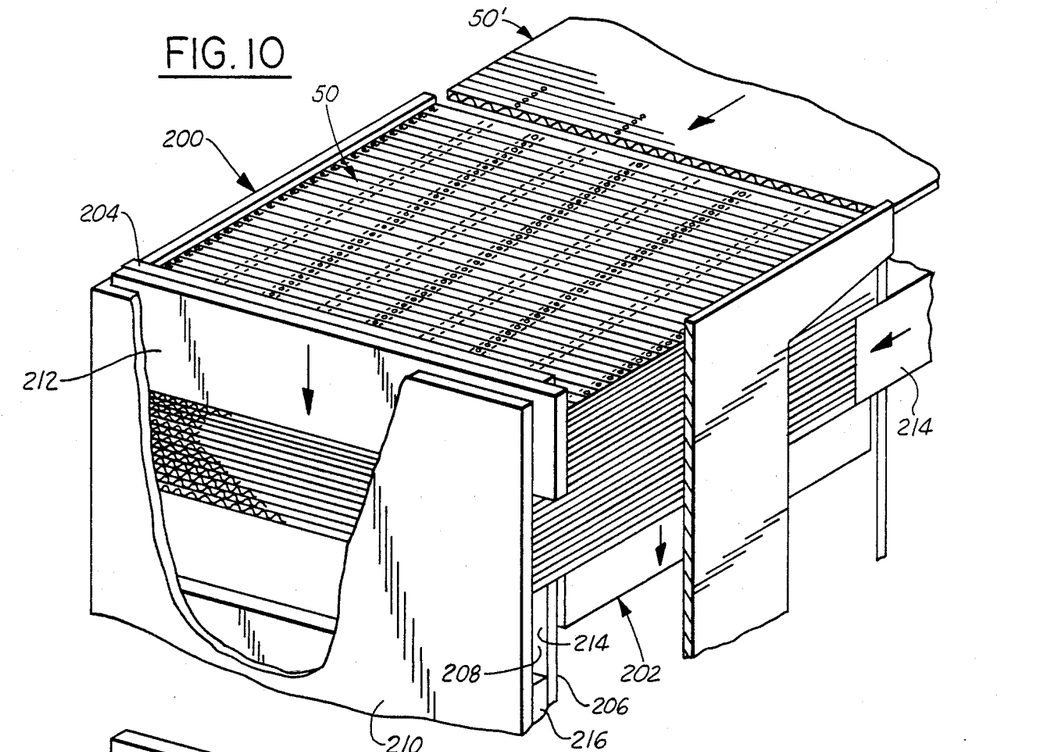
FIG. 10 is a fragmentary, simplified and semi-schematic view of the fourth step and station of the method and apparatus of the first embodiment of the invention in which the die cut and glue bearing sheets are stacked one on top of another to form a predetermined stack-up of a given number of sheets, and in which a mutually adhered end segment of the stack-up is sheared from the stack in a vertical plane of weakness defined by the transverse slit pattern of the sheets to form a laminar stack of strips of the sheet material in unexpanded form.
Figure 11:
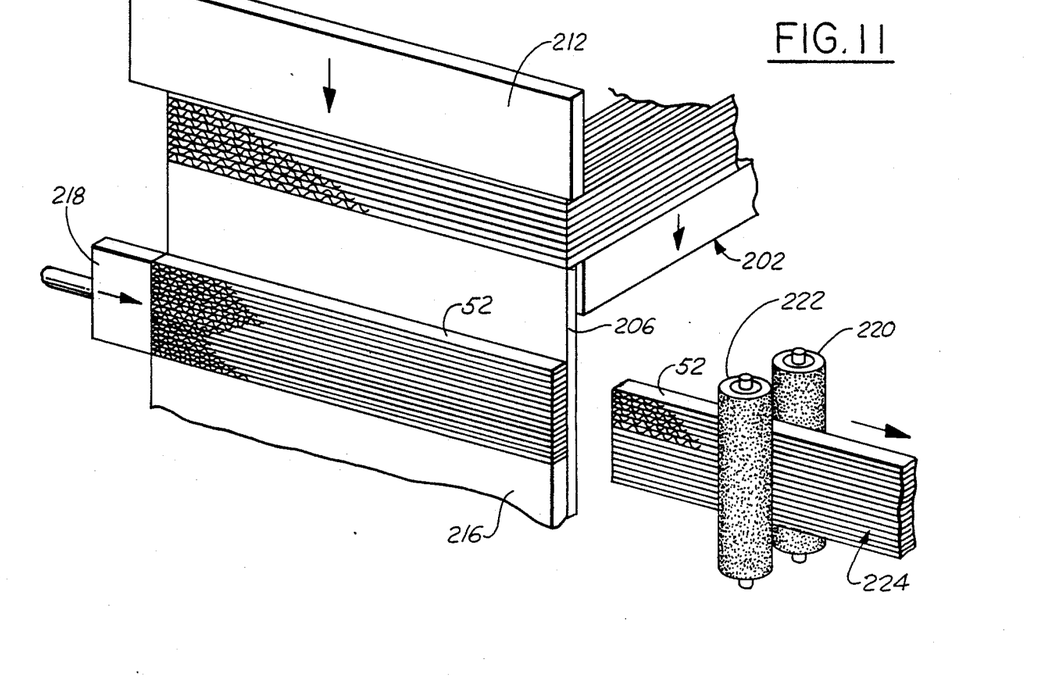
FIG. 11 is a fragmentary, simplified and semi-schematic view of a portion of the apparatus of FIG. 10 illustrating both the end shearing operation as well as a feed operation in which the sheared strip stack-up is advanced from the shear station to a final sanding step and station in which each of the stacks of adhered strips is passed edgewise between a pair of opposite sanding drums to provide opposed edges of the stack with perfectly planar surfaces spaced apart at precisely controlled distances.

Referring to FIGS. 10 and 11, after adhesive has been applied to the sheets in the gluing station of FIG. 8, the sheets 50 are fed one at a time by conveyor 120 to a stacking station illustrated in FIG. 10 wherein each sheet 50 is discharged by the conveyor and deposited in superimposed stacked relation in a magazine 200. The sides of the magazine are so positioned to direct the sheets into superimposed registry so that the peripheral edges and transverse strips 52, 54, etc. are quite accurately registered. As successive sheets 50, 50', 50" etc. drop into the magazine 200, an elevator mechanism 202 is operated in successive steps to lower the supply of sheets in the magazine through a distance equal to the thickness of one sheet and in time relation thereto, so that the top of the stack is at all times at the same level adjacent the top of the magazine.

In the illustrated exemplary stack as shown in FIG. 10 the leading edges of each sheet abut against an end plate 204. Assuming that it is desired to form a cellular core structure each consisting of fourteen strips 52 the gluing mechanism 122 is automatically cycled to deposit glue spots on only the first thirteen sheets, and the fourteenth sheet then passes thereunder without having any adhesive deposit thereon. Thus, when the fourteen sheets have been deposited in the magazine 200, they will be adhered together but the fifteenth sheet will not adhere to the fourteenth sheet and will thus start a new pad.

The stop plate 204 has a vertical height slightly greater than the desired stack pad height and its lower edge is spaced by distance slightly greater than the pad height above the upper edge of a guide plate 206 to thereby define an opening into a throat 208 of a shearing mechanism. The shearing mechanism may comprise a guide plate 210 and guide plate 206, and a vertically reciprocating shearing blade 212. When elevator 202 has descended to bring the preselected 14 layer stack-up in registry with the opening between stop 204 and guide 206, a pusher 214 (FIG. 10) is automatically cycled to engage the trailing edges of the fourteen layer stack-up and then advance the stack-up leading edges into the opening of throat 208 until the leading edges abut guide plate 210 as shown in FIG. 10. This ensures an even more accurate registry of the sheets in the stack-up, and brings the face 214 into vertical alignment with the first row of transverse slits 64–90 of the between transverse strips 52 and 54 of each of the fourteen stacked-up sheets 50, 50', 50", etc. By the time that a fourteen layer stack-up has been advanced by pusher 214 into shearing position with leading edges against plate 210, the adhesive material of the glue spots will have set enough so that the pad is securely bonded together.

A shearing operation is performed by forcing shearing blade 212 vertically downwardly from the position thereof shown in FIG. 10 and 11 to a position overlapping plate 206 to thereby shear the fourteen layer stack-up of transverse strips 52 from their associated sheets 50, 50', 50", etc. along the vertical plane of weakness defined by the short and long slits 64–90, thereby forcing the severed stack-up of strips 50 downwardly in throat 208 against a bottom stop plate 216, the severed strip stack-up being confined by the guide plates 206 and 210. The severed stack-up of strips 52 resting on stop 216 is then ejected endwise from the shearing mechanism by another pusher 218 which forces the same horizontally to the right as viewed in FIG. 11 into a final sanding step and station. As illustrated schematically in FIG. 11, in the sanding station each stack of adhered strips is passed edgewise between a pair of opposite sanding drums 220 and 222 to provide opposed edges of the stack with perfectly planar surfaces spaced apart at a precisely controlled distance. Importantly, this surfacing action also severs the slight remaining liner board and corrugating medium fibers created by perforated slit scores 64, 66, 68, etc., previously described, allowing the honeycomb to expand to its natural cell size along the glue spots and associated creases. The finished strip stack-up 224 in its unexpanded form shown in FIG. 11 may then be stored and packaged for shipment to another facility wherein the same is expanded into a honeycomb structure and utilized as a filler or reinforcement honeycomb core material in sandwich type laminated products such as hollow core flush doors, interior portable wall partitions or the like.

Figure 12:
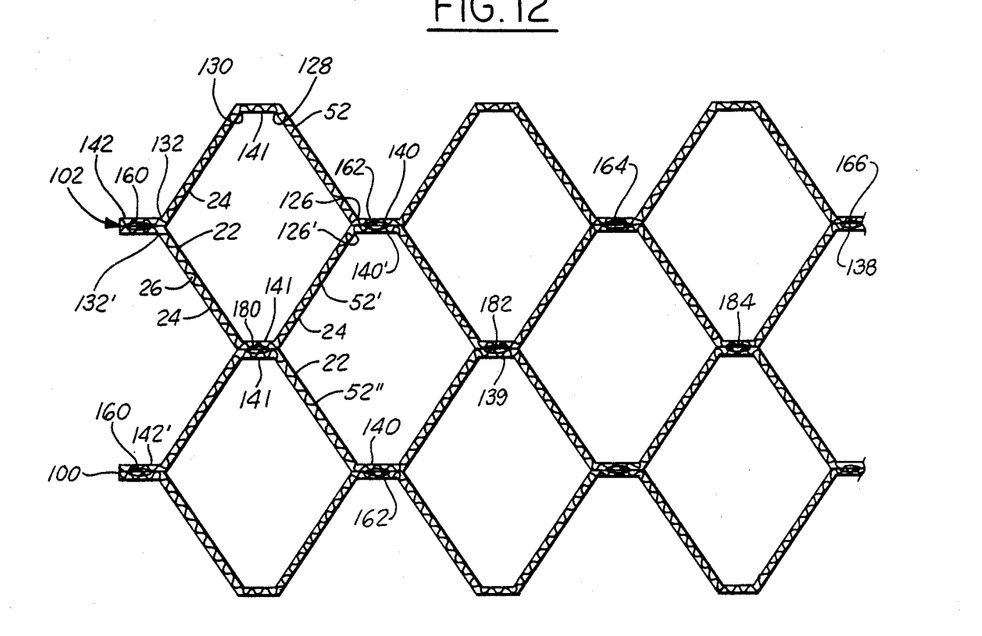
FIG. 12 is a fragmentary top plan view of a portion of the honeycomb strip material produced in the method and apparatus of FIGS. 1–11 after the same has been expanded into a honeycomb geometric pattern so as to define a cellular core struction to which suitable face sheets may be adhered to produce a structural panel.
Figure 12A:
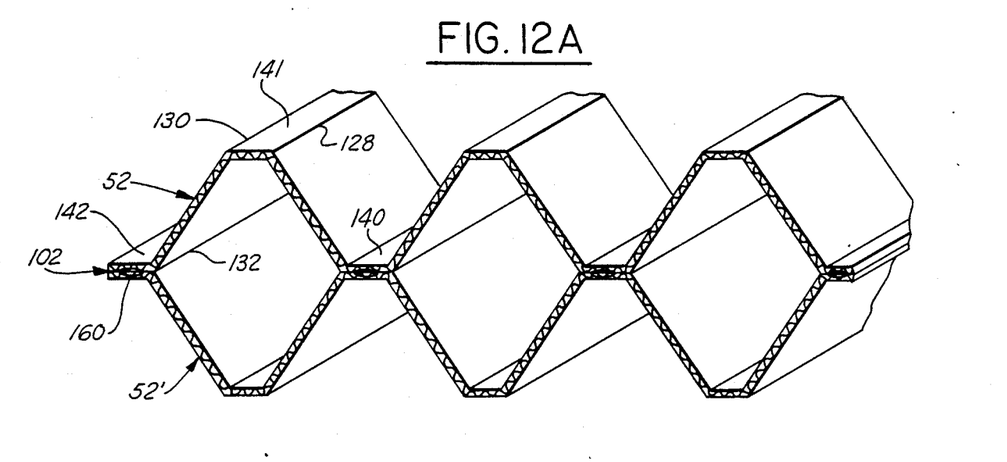
FIG. 12a is a fragmentary, perspective view of a portion of the expanded honeycomb core or filler structure of FIG. 12.

Referring to FIGS. 12 and 12a, when the finished unexpanded honeycomb strip material 224 is fully expanded for its end use the same will have the appearance in a fragmentary top plan view as shown in FIG. 12. Assuming this to be a portion of the fourteen layer stack-up of the first transverse strips 52 described previously, the honeycomb consists of the top strip 52 as viewed in FIG. 12 to which no adhesive was applied due to the automatically cycling of the gluer 122. The next strip 52' will have the glue spots 160, 162, 164, 166 applied to its upper surface (top paper layer 22) adhered to the corresponding nonglue applied face of the bottom sheet 24 of strip 52. The third strip 52", which has the glue spots 180, 182, 184 applied to its top sheet 22 in the gluing station will be adhered by these glue spots to the bottom sheet 24 of second sheet 52'. Thus, strips 52' and 52" will be joined along the longitudinal strip 141' by the glue spots 180. The other longitudinal strips of sheets 52' and 52" are similarly joined by their associated glue spots 182, 184 and 186.

Note also that the honeycomb as it is being expanded from the compressed state of FIG. 11 to the expanded state of FIGS. 12 and 12A folds readily and neatly along the crease lines 132, 130, 128, etc. provided by the rows of perforated slit-scores 110, 112, 114, 116, etc. to maximize the expansion distance of the compressed material and thus maximize the volume to mass or weight ratio of the honeycomb filler material. Material savings also accrue from providing the very narrow adhered strip portions 136–142 along the honeycomb.

The volume-to-weight ratio of the honeycomb is also optimized by providing the narrow longitudinal adhering strip portions 130, 132, etc. versus the long diagonal portions of the honeycomb formed by the long through-cut lines 80–90. The shearing operation is more precise and accurate due to minimizing of the mass of the longitudinally interconnecting portions 22a, 24a, 26c in the rotary die cut pattern. With this cut pattern there is a major plane of weakness vertically between each stacked layer of strips 52, 52' and the next successive transverse strips 54, 54' etc., leaving a minimum of material to be sheared. Note also that there is a savings in material from the elimination of the sawing step employed in the aforementioned Kauffman U.S. Pat. No. 3,301,729. An even greater material savings accrues from eliminating need of the marginal strips 14 of the sheets in the Kauffman array which must be removed and discarded as waste material in order to permit expansion of the laminated material into a honeycomb cellular structure. Moreover, there is much less material that need be removed in the final sanding operation between sanding rolls 220 and 222, further reducing waste of material and processing time. For the end user there is a further advantage in that the material strip 224 in its unexpanded state will tend to expand more uniformly because resistance to expansion is reduced due to the crease lines provided by the rotary die cutter, thereby rendering the use of the honeycomb material less expensive and more reliable and uniform in the finished laminated construction.

Second Embodiment

In the second embodiment of the invention as illustrated in FIGS. 13–17, the starting material and sheet feed may be same as in the first embodiment, and a rotary die cutting step and station is also employed. Hence, as illustrated in the perspective, semi-schematic view of FIG. 13 a sheet 30 of starting material as described previously is fed by a conveyor, such as conveyor 27 of FIG. 1, between the top and bottom rolls 42 and 44 of a rotary die cutter or similar mechanism provided with a modified rotary die cutter 46'. A modified rule set up is utilized in die cutter 46' adapted to produce a modified die cut pattern in sheet 30 to convert the same into a die cut sheet 50' as the same emerges from the rotary die cutting station.

Figure 15:
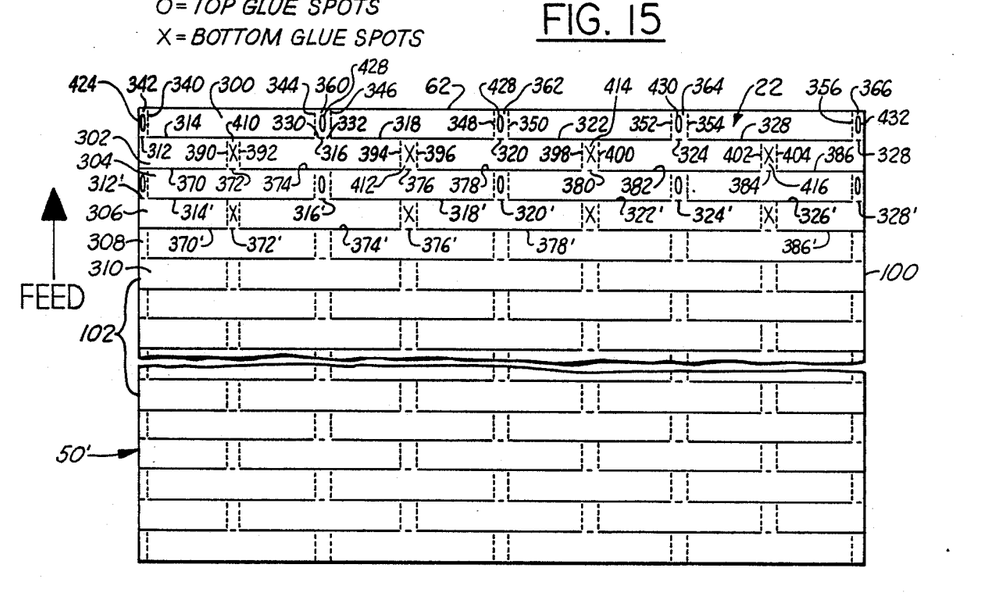
FIG. 15 is a fragmentary top plan view of a single sheet of the sheet material having a predetermined slit and crease pattern with a predetermined glue spot pattern applied to the top and bottom surfaces thereof as the same emerges from the gluing station of FIG. 13.
Figure 16:
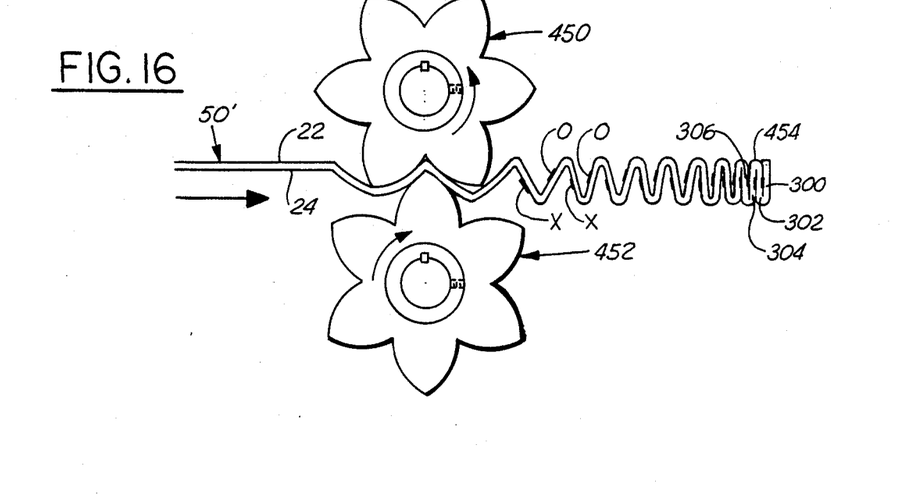
FIG. 16 is a simplified side elevational view of the star folding step and station of FIG. 13.

Referring in more detail to FIG. 15, a rotary die cut sheet 50' of the second embodiment is shown in top plan view with its leading edge 62 at the top of the Figure. As will be seen in FIG. 15, the die cut pattern of sheet 50' differs from that of sheet 50 in several respects, but also resembles that of sheet 50 in several respects. Sheet 50' is die cut to form a successive series of transverse strips 300, 302, 304, 306, 308, 310, etc. of equal width by transverse lines formed of an alternating series of very short and very long die cut perforated slit-score and through-cut slits 312, 314, 316, 318, 320, 322, 324, 326 and 328 respectively between the first and second transverse strips 300 and 302. Note that the first cut line 312–328 terminates at its opposite ends in the short perforated slit-scores 312 and 328 which are spaced slightly inwardly from the associated side edges 102 and 100 of sheet 50'. Hence, the first and second strips 300 and 302 after die cutting remain interconnected longitudinally of the sheet by very small interconnecting portions, such as portions 330 and 332 remaining between short perforated slit-score 316 and the two adjacent long through-cut 314 and 318 in FIG. 15. As in the first embodiment, these interconnecting portions consist of the uncut top sheet 22 and bottom sheet 24 and the uncut portion of the corrugated paper 26 therebetween. Again, the ridge lines of the corrugated paper 26 run in the direction of sheet feed or perpendicular to the transverse slit lines 312–328.

Each strip 300, 302, etc. is also provided with crease lines made up of a longitudinally extending row of short perforated slit-scores or simple creases. The crease rows of strip 300 consist of a first row of perforated slit-scores or creases 340 spaced inwardly from sheet edge 102 at a predetermined distance to define therewith an adhesion strip 342. Similar longitudinally extending crease rows are formed in transverse strip 300 at 344, 346, 348, 350, 352, 354, respectively aligned with the ends of the associated long through-cut 314, 318, 322 and 326. A further longitudinally extending crease row 356 is formed at the right hand side of strip 300 as viewed in FIG. 15, spaced slightly inwardly from side edge 100 by the same distance as row 340 from edge 102. These crease rows thus define further adhesion strips 360, 362, 364 and 366, each equal in width and equal to the width of strip 342, at equal spaced increments along transverse strip 300. Note that these adhesion strips have the short perforated slit-scores 312, 316, 320, 324 and 328 respectively aligned with the center of these strips.

An option exists in extending the crease lines (340, 390, etc.) through every row of strips (300, 302, 304, etc.) to further define each glue line and break point, although this is generally not necessary.

The next two successive rows of transverse strips 302 and 304 are separated by a similar transverse die cut slit-line made up of end cut 370 which extends all the way out and intersects the side edge 102 of sheet 50', short perforated slit-score (p/s/s) 372, long cut 374, short p/s/s 376, long cut 378, short p/s/s 380, long cut 382, short p/s/s 384 and another half long-length cut 386 which intersects the opposite sheet side edge 100. It is to be noted that the long and short cuts and p/perforated slit score/s between sheets 302 and 304 are offset transversely of sheet 50' relative to the slit line 312–328 so that the short p/s/s 372, 376, 380 and 384 line up longitudinally of the sheet with the center of the long cuts 314, 318, 322 and 326 respectively. The end cuts 370 and 386 are thus half the length of the longer cuts 374, 378 etc. Short p/s/s 372, 376 etc. are the same length as the previous short p/s/s 312, 316, etc. Row 302 is also provided with a series of longitudinally extending rows of short creases to form fold lines 390-404 arranged in pairs and spaced apart to form adhesion strips 410, 412, 414, and 416 equal in width to the previously described adhesion strips 342, 360, 362 etc. but offset therefrom transversely of sheet 50' at the midpoints of long cuts 314, 318, etc.

The next transverse cut line formed between the third and fourth transverse strips 304 and 306 is identical to the first transverse cut line 312-328 and hence is identified by the reference numerals 312' through 328'. Thereafter, the pattern repeats and hence the cut line 370'-386' between the fourth and fifth strips 306 and 308 is identical to the cut line 370-386 (and thus the same reference numerals raised by a prime suffix are applied thereto).

Glue Applying Step and Station

Referring again to FIG. 13, the die cut sheet 50' is fed into a gluing station wherein a conventional but modified glue spot applying apparatus is utilized, comprising an upper glue spotter 420 and a lower glue spotter 422 and associated glue and pressurizing apparatus and cycling mechanism (not shown). Gluers 420 and 422 are adapted to apply transversely extending rows of glue spots to the top and bottom sheets 22 and 24 of sheet 50' in a predetermined, precisely controlled pattern. This glue pattern is indicated schematically in FIG. 15 wherein glue spots applied to the top sheet 22 are indicated by a circle "0", whereas glue spots applied to the bottom sheet 24 are indicated by an "X". The glue spots are shown applied only to the first four rows of transverse strips 300, 302, 304, 306, it being understood that this pattern is repeated through the remaining successive transverse die cut rows of sheet 50'. Note that the glue spots applied to top sheet 22 are numbered in the first transverse strip 300 as spots 424, 426, 428, 430 and 432. These spots are disposed centrally of the respectively associated adhesion strips 342, 360, 362, 364 and 366 both laterally and longitudinally thereof. Similarly, the glue spots indicated by "X" applied to bottom sheet 24 are located in the center of adhesion strips 410, 412, 414 and 416 of transverse strip 302. The same top and bottom alternating glue spot pattern is repeated alternately on successive transverse strips 304 and 306 as indicated in FIG. 15. However, the last or trailing strip of any given sheet has no adhesive applied thereto.

Star Folding Step and Station

Referring again to FIG. 13, the next step in the method of the second embodiment is practiced in a star folding station provided with upper and lower arrays of conventional star folding wheels 415, 452 respectively between which the sheet 50', with the top and bottom glue spots applied thereto, is fed by a suitable conveyor mechanism (not shown). As shown in the simplified side elevational view of FIG. 16, star folders 450 and 452 operate through their intermeshing relationship to fan fold sheet 50' into an accordion folded stack-up indicated at 454 in FIGS. 13 and 16. As sheet 50' is fan folded and compressed into the accordion stack-up, the top glue spots "0" and bottom glue spots "X", while still wet (uncured), are brought into contact with the juxtaposed surface of the corresponding next adjacent transverse strip to make contact therewith and adhere thereto. Thus the circle "O" glue spots 424-432 of strip 300 are brought into contact with the associated bare portions of strip 302 shown longitudinally aligned with these glue spots in FIG. 15. Likewise, the glue spots indicated by an "X" on strip 302 are brought into contact with those associated bare spaces of strip 300 aligned longitudinally of sheet 50' with the glue spots of strip 302. Since the last strip is without adhesive, it serves as a tack-free carrier surface for the fanfold array similar to the exposed surface of the leading strip.

Figures 13, 17:
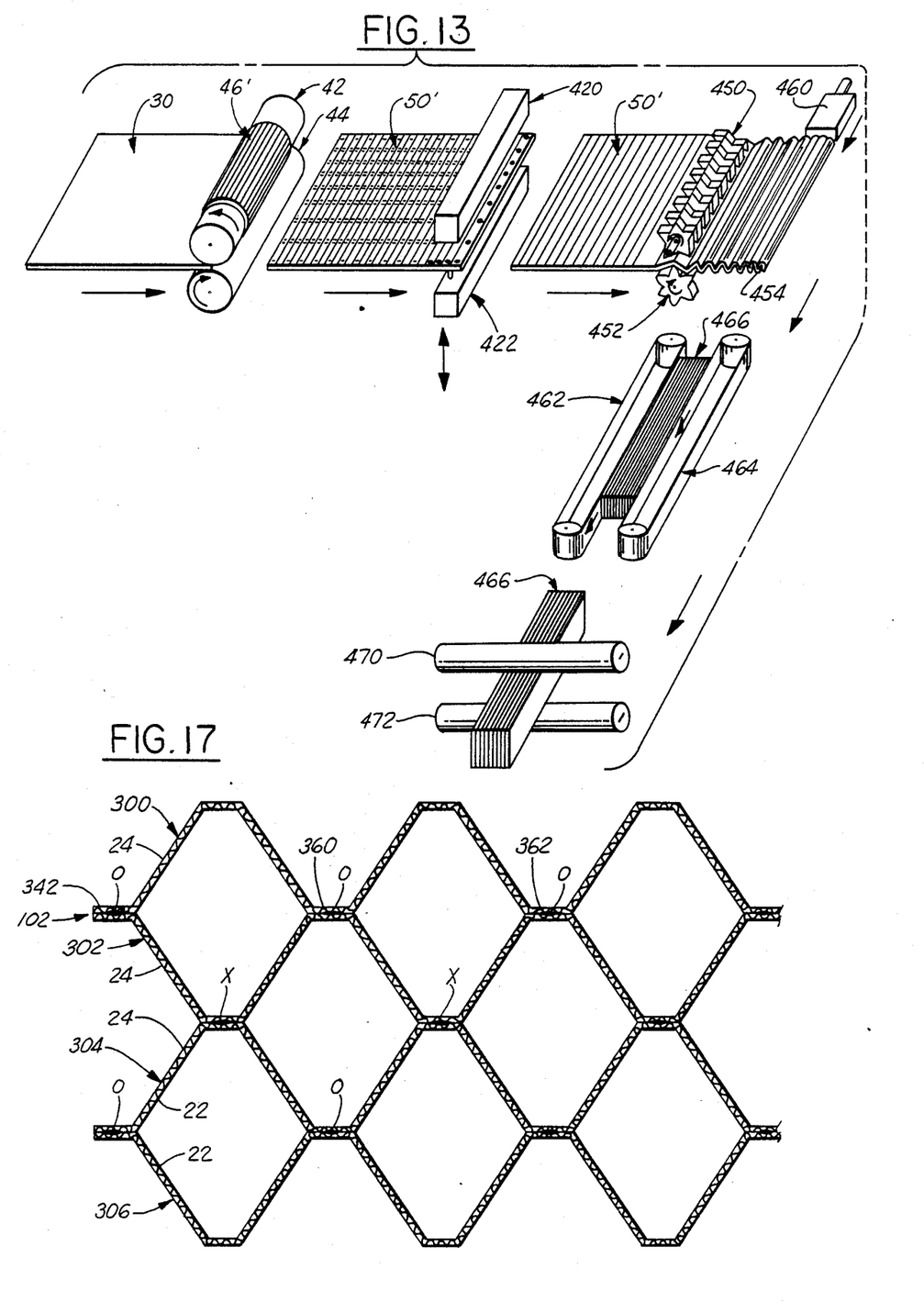
FIG. 13 is a simplified and semi-schematic perspective view of a series of steps and stations employed in a second embodiment of the invention to produce an unexpanded laminated stack-up of mutually adhered strips of the processed sheet material which in final form corresponds to that produced in the first embodiment of the invention.
FIG. 17 is a fragmentary top plan view of the honeycomb cellular core structure produced in the second embodiment of the invention as shown in expanded form ready for use as a honeycomb filler for a incorporation into a structural panel.
Figure 14:
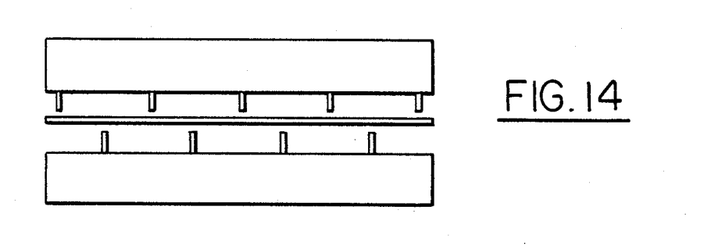
FIG. 14 is a simplified semi-schematic end elevational view of the gluing step and station of the embodiment of FIG. 13.

After sheet 50' has thus been fan folded and formed into the compact accordion format of stack 454, the accordion compacted array is advanced endwise by a shear pusher 460 (FIG. 13). This transfer out of the star folding and accumulation station preferably forces the folded stack 454 directly into a compression glue-setting station. The compression station is illustrated schematically in FIG. 13 as a pair of endless belts 462 and 464 traveling in the direction indicated by the arrows in FIG. 13 so as to receive each accordion folded sheet of adhered strips indicated at 466. Belts 462 and 464 are adapted to compress and squeeze strip 466 between the mutually facing belt runs thereof while also advancing stack-up 466 therethrough, the squeeze pressure and transit time being predetermined to insure adhesion and curing of the adhered glue spotted areas to the mutually contacting surfaces prior to emerging from this station.

Sanding Step and Station

After leaving the compression unit the compressed and fully adhered stack-up 466 is precision surfaced on both sides by advancing the same in a single pass through a commercially available abrasive surfacing machine comprising abrasive rolls 470 and 472 in FIG. 13.

It will be noted that a compressed, accordion folded stack-up 466 as it leaves the compression belts 462 and 464 will have the transverse strips 300, 302, 304, etc. interconnected by and at each of glue spots, as well as by the longitudinally interconnecting it portions of sheet 50 disposed between the short transverse slits and the next adjacent long transverse slits, i.e., portions 330 and 332 described previously. Since these paper connecting portions 330 and 332 are aligned with an associated adhesion strip 342, 360 or 410, 412, etc., they may be left intact, either totally or partially, in the final compressed product inasmuch as the same do not interfere with the honeycomb expansion of the final product. Preferably, however, these paper interconnecting portions are removed in the abrasive surfacing machine 470, 472 by adjusting the depth of cut as the pack 466 is fed therethrough so that the end edges of the accordion folded material are removed to a depth which also removes the folded paper connecting portions 330 and 332, etc. In this event, strips 300, 302, 304, etc. are held together only by the associated glue spots.

As in the first embodiment, the finished compressed, adhered and dressed pack 466 leaving the abrasive surfacing station may be stored for shipment to an end user at a flush door fabricating facility or the like. When the finished pack 466 is expanded into a honeycomb reinforcement cellular filler structure the same as viewed in an end view will have the arrangement of FIG. 17 wherein portions of four transverse strips 300, 302, 304 and 306 are adhered by the associated glue spots "0" and "X" as indica in FIG. 15.

From the foregoing description and drawings, it will now be apparent that the present invention, in both of the illustrative embodiments disclosed in detail herein, as well as in variations thereof which will now be evident to those skilled in the art, possesses many advantages over the aforementioned prior art patents. For example, the first embodiment of the invention of FIGS. 1-12 is advantageous over the aforementioned Kauffman U.S. Pat. No. 3,301,729 in that there is no need to provide the margin strips 2 and 14 of Kauffman since the die cut sheets are held together by the very small but high tensile strength longitudinal connecting portions such as 22a, 24a and 26c spaced at intervals transversely across sheet 50. Hence there is a savings in material costs over Kauffman in this respect. Moreover, the multiplicity of these evenly spaced connecting portions, extending as they do in the direction of sheet feed and corrugation ridge lines, assists in material handling during processing. In addition, in the first embodiment the stack-up of strips in the magazine 200 may also be utilized for the stacked strip separation operation, providing for greater accuracy, precision and economy in processing. Due to the major vertical plane of weakness from one stacked strip to the next in the stacked sheets created by the heavily die cut pattern, a rapid shear-type separation operation becomes feasible while at the same time eliminating the waste material and saw dust problems of the sawing operation in Kauffman. Moreover, the sheets in the stacking magazine held together in a more precise manner by the spaced longitudinally interconnecting portions than is the case in where each sheet is held together only by the marginal strips 2 and 14. Hence, due to this more precise vertical alignment of the slits or strip edges in the stack-up, less material has to be removed in the sanding operation to provide the precise finished dimension, again providing further savings in material and processing costs.

With respect to the second embodiment disclosed in conjunction with FIGS. 13-17, the same possesses many of the aforementioned advantages of the first embodiment. In addition, the second embodiment method and apparatus does not require the stacking operation of the aforementioned Kauffman '729 patent. Again, due to the higher precision resulting from this second embodiment of the method and apparatus of the invention, less material need be removed in the sanding operation than in the aforementioned Kauffman '729 patent. The second embodiment also lends itself to a high production rate because the processing set up is essentially a continuous operation.

In both embodiments, the die cutting process performed to create the slitted sheets 50 and 50' produces a highly flexible crease line in a double pattern next to each glue spot. This causes the honeycomb to break evenly when expanded to give more complete expansion and more uniform cell sizes, both features being highly advantageous to the end user. The printing of the glue on each "spot" further reduces the amount of fiber board needed to fill a given void size by reducing the size of the glue joint. Less adhesive material is also required. The biggest single advantage in both embodiments is believed to be the capability of the invention to employ current state-of-the-art die cutting technology to significant savings in labor and material while also obtaining a better quality product with more uniform dimensional control of the same.

Although a single specific exemplary sequence of steps and a single form of apparatus has been described herein with respect to each of the illustrative embodiments of the invention, it is to be understood that the same are merely illustrative of the principles of the invention and that other variations of the method, apparatus and/or intermediate die cut product will become apparent to those skilled in the art from the foregoing description, drawings and appended claims. Accordingly, it is to be understood that the invention is not to be limited to the exemplary construction herein shown and described, but may be made in various ways within the scope of the appended claims as only limited by the applicable prior art. It is also to be understood that various terms of dimensional geometry and orientation employed herein, such as "horizontal", "vertical", "length", "width", etc., are used by way of description to facilitate understanding and not by way of limitation.

I claim:

1. A method of forming cellular core structures from corrugated fibreboard comprising the steps of:
   (1) providing a starting material in the form of a plurality of flat sheets of single wall corrugated board of rectangular configuration in plan view each having identical predetermined length and width dimensions, said board having top and bottom flat facings and one corrugated inner member disposed between and glued to the inner surfaces of said flat facings the flutes of said inner member extending parallel to one of said dimensions;
   (2) feeding said sheets endwise one at a time in the direction of the longitudinal dimension of said flutes into a die cutting station;
   (3) die cutting and crease-lining of said sheets seriatim in said die cutting station to impart to each said sheet (a) a parallel array of evenly spaced direct lines extending perpendicular to said flute-feed direction from side edge to the other side edge of each sheet, each said die cut line being defined by an alternating series of very long die cuts and very short die cuts individually spaced from one another along said die cut line by very short uncut sheet material connecting portions to thereby form a plurality of strips of said sheet material intermittently integrally joined by said uncut sheet material connecting portions, the dimension of each strip in the direction of sheet feed being only slightly greater than the desired final thickness dimension of the honeycomb cellular core structure to be made from the die cut sheet, and (b) an array of crease lines extending parallel to said flute-feed direction and arranged in pairs spaced apart in the direction of said die cut lines and closely flanking each of said uncut connecting portions, (4) then feeding each as so die cut and crease-lined endwise in the direction of longitudinal dimension of the flutes therein, into a gluing station and thereon individual glue spots in a predetermined pattern to outer surface of at least one of said top and bottom facings between selected pairs of crease lines which are to be juxtaposed to a of the outer surface of the facing opposite said one facing of a juxtaposed strip having no glue spot applied thereto, and (5) then forming from said die cut, crease-lined and glue-spotted sheets a plurality of stacks of adhesively bonded honeycomb-formable strips of said sheet material by juxtaposing the face of one strip having glue spots thereon to the face of another strip having no glue spots thereon with the glue spots of the second strip alternating lengthwise of the strip with the glue spots of the first strip.

2. The method as set forth in claim 1 including the further step of removing the short uncut sheet material connecting portions from said strips whereby the strips remain adhered together only by said glue spots.

3. The method as set forth in claim 1 wherein said die cutting and crease-lining step is performed by passing each sheet one at a time edgewise between rotary die cutting means to thereby rotary die cut and form said cut and crease lines therein.

4. The method as set forth in claim 3 wherein said rotary die cutting pattern comprises a pattern of die cut lines wherein each said die cut lines terminates slightly short of said side edges with the side edge ends of each of said die cut lines being defined by terminal ones of said very short die cuts, and each of said crease lines of each strip is aligned longitudinally within an associated crease line of adjacent interconnected strips, and wherein each of the spaces between the terminal one of the very short die cuts and the associated side edges of the sheet material is solely occupied by one of said uncut connecting portions.

5. The method as set forth in claim 4 wherein said glue applying step is performed by applying said gluespots as relatively small dots to the outer surface of the top facing of each strip of each of said sheet in an array wherein a line of glue spots is formed extending in the feed sheet direction and aligned with alternate ones of said very short die cuts.

6. The method as set forth in claim 5 wherein the glue applying step further comprises successively shifting the glue applying pattern alternately back and forth perpendicularly to the sheet feed direction from sheet to sheet so that the lines of glue spots alternate sheet-to-sheet whereby when said sheets are successively stacked upon one another with their edges and length and width dimensions registering in stacked alignment the spots on each strip are juxtaposed between the spots of the strip superimposed in contact therewith in said stack-up.

7. The method as set forth in claim 6 wherein said steP of forming glued stacks of strips comprises forming a stack-up cf a predetermined number of said sheets, successively shearing from said stack-up a superimposed row of strips registering in the direction of said stack-up to provide a glued pack of sheared strips having the same number of plies as the sheets in said stack-up, said uncut connecting portions of said pack being thereby shear-severed from the adjacent strip associated therewith in each sheet.

8. The method as set forth in claim 7 wherein said glued pack of sheared strips are finished after shearing and glue-setting by being conjointly edge sanded to finish dimension.

9. The method as set forth in claim 3 wherein said die cutting is set-up to produce in said first and second sets of die cut lines, said first set being characterized by every other one of said die cut lines terminating at said side edges in a half length very long die cut extending through the associated side edge to thereby form a first array of said die cut lines, and wherein said second set is formed by the remaining ones of said die cut lines interposed alternately between said first set of die cut lines, said lines of said second set having their corresponding short and long cuts and crease lines aligned in said flute-feed direction and offset in staggered relation to those of said first set, and wherein every one of said second set of die cut lines terminates slightly short of said side edges with the side edge ends of each of said second set die cut lines being defined by terminal ones of said die cuts wherein the space between said terminal ones of said very short die cuts and the associated side edge of said sheet material is wholly occupied by one of said uncut connecting portions.

10. The method as set forth in claim 9 wherein the gluing step comprises applying glue spots simultaneously to both the outer surface of the top facing and the outer surface of the bottom facing on each sheet as the same is fed through said gluing station, said glue spots being applied in an array on the top facing wherein a glue spot is applied between each pair of crease lines in a first set of alternating strips having a crease line disposed adjacent the side edges of the sheet material, and wherein the glue spots on the bottom facing are arranged so that the glue spots are applied thereto in array wherein a glue spot is applied between each pair of crease lines onto a second set of alternate strips disposed between said first strips.

11. The method as set forth in claim 10 wherein the step of forming the adhesively bonded stacks of strips includes advancing each sheet with said glue spots applied to the top and bottom facing thereof into a star folding station wherein the sheet is progressively star folded into an accordion stack-up so as to bring the glue spots of each strip into contact with a juxtaposed bare portion of the opposite facing of the juxtaposed strip as the same are compressed together in an accordion fold stack up.

12. The method as set forth in claim 11 including the further step of removing the interconnecting uncut portions in said sheet material by passing each accordion folded stack of adhesively bonded strips of the sheet material through sanding means operable to dress the opposite folded edges of said strip stack-up to a finish depth sufficient to remove enough edge material to also remove said uncut connecting portions exposed at said edges of the stack up.

13. Apparatus for forming cellular core structures from corrugated fibreboard comprising in combination:
   (1) supply means for providing a starting material in the form of a plurality of flat sheets of single wall corrugated board of rectangular configuration in plan view each having identical predetermined length and width dimensions, said board having top and bottom flat facings and one corrugated inner member disposed between and glued to the inner surfaces of said flat facings, the flutes of said inner member extending to one of said dimensions;
   (2) means for feeding said sheets endwise one at a time in the direction of the longitudinal dimension of said flutes into a die cutting station;
   (3) means for die cutting and crease-lining each of said sheets seriatim in said die cutting station to impart to each said sheet (a) a parallel array of evenly spaced die cut lines extending perpendicular to said flute-feed direction from one side edge to the other side edge of each sheet, each said die cut line being defined by an alternating series of very long die cuts and very short die cuts individually spaced from one another along said die cut line by very short uncut sheet material connecting portions to thereby form a plurality of strips of said sheet material intermittently integrally joined by said uncut sheet material connecting portions, the dimension of each strip in the direction of sheet feed being only slightly greater than the desired final thickness dimension of the honeycomb cellular core structure to be made from the die cut sheet, and (b) an array of crease lines extending parallel to said flute-feed direction and arranged in pairs spaced apart in the direction of said die cut lines and closely flanking each of said uncut connecting portions,
   (4) glue station means for feeding each sheet as so die cut and crease-lined endwise in the direction of longitudinal dimension of the flutes therein and applying thereon individual glue spots in a predetermined pattern to the outer surface of at least one of said top and bottom facings between selected pairs of crease lines which are to be juxtaposed to a portion of the outer surface of the facing opposite said one facing of a juxtaposed strip having no glue spot applied thereto, and
   (5) means for forming from said die cut, crease-lined and glue-spotted sheets a plurality of stacks of adhesively bonded honeycomb-formable strips of said sheet material by juxtaposing the face of one strip having glue spots therein to the face of another strip having no glue spots thereon with the glue spots of the second strip alternating lengthwise of the strip with the glue spots of the first strip.

14. The apparatus as set forth in claim 13 including means for removing the short uncut sheet material connecting portions from said strips whereby the strips remain adhered together only by said glue spots.

15. The apparatus as set forth in claim 13 wherein said die cutting and crease-lining means includes rotary die cutting means operable for rotary die cutting and forming said cut and crease lines in each sheet one at a time as the same are fed edgewise through said rotary die cutting station.

16. The apparatus as set forth in claim 15 wherein said rotary die cutting means comprises a cutting and crease rule set-up operable to produce a pattern of die cut lines in each sheet wherein each of said die cut lines terminates short of said side edges with the side edge ends of each of said die cur lines being defined by terminal ones of said very short die cuts, and each of said crease lines of each strip is aligned longitudinally within an associated crease line of adjacent interconnected strips, and wherein each of the spaces between the terminal ones of the very short die cuts and the associated side edges of the sheet material is solely occupied by one of said uncut connecting portions.

17. The apparatus as set forth in claim 16 wherein said glue station means includes means for applying said glue spots as relatively small dots to the outer surface of the top facing of each strip of each of said sheet in an array wherein a line of glue spots is formed extending in the feed sheet direction and aligned with alternate ones of said very short die cuts.

18. The apparatus as set forth in claim 17 wherein said glue applying means further comprises means for successively shifting said glue applying means alternately back and forth perpendicularly to the sheet feed direction from sheet to sheet so that the lines of glue spots alternate sheet-to-sheet whereby when said sheets are successively stacked upon one another with their edges and length and width dimensions registering in stacked alignment the spots on each strip are juxtaposed between the spots of the strip superimposed 19. The apparatus as set forth in claim 18 wherein said means for forming glued stacks of strips comprises means for forming a stack-up of a predetermined number of said sheets, and means for successively shearing from said stack-up a superimposed row of strips registering in the direction of said stack-up to provide a glued pack of sheared strips having the same number of plies as the sheets in said stack-up, said uncut connecting portions of said pack being thereby shear-severed from the adjacent strip associated therewith in each sheet.

20. The apparatus as set forth in claim 19 further including sanding means wherein said glued pack of sheared strips are finished after shearing and glue-setting by being conjointly edge sanded to finish dimension.

21. The apparatus as set forth in claim 15 wherein said rotary die cutting means has a rule set-up operable to produce in said pattern first and second sets of die cut lines, said first set being characterized by every other one of said die cut lines terminating at said side edges in a half length very long die cut extending through the associated side edge to thereby form a first array of said die cut lines, and wherein said second set is formed by the remaining ones of said die cut lines interposed alternately between said first set of die cut lines, said lines cf said second set having their corresponding short and long cuts and crease lines aligned in said flute-feed direction and offset in staggered relation to those of said first set, and wherein every one or said second set of die cut lines terminates slightly short of said side edges with the side edge ends of each of said second set die cut lines being defined by terminal ones of said die cuts wherein the space between said terminal ones of said very short die cuts and the associated side edge of said sheet material is wholly occupied by one of said uncut connecting portions.

22. The apparatus as set forth in claim 21 wherein said glue station means comprises means for applying glue spots simultaneously to both the outer surface of the top facing and the outer surface of the bottom facing on each sheet as the same is fed through said glue station means, said glue spots being applied in an array on the top facing wherein a glue spot is applied between each pair of crease lines in a first set of alternating strips having a crease line disposed adjacent the side edges of the sheet material, and wherein the glue spots on the bottom facing are arranged so that the glue spots are applied thereto in array wherein a glue spot is applied between each pair of crease lines onto a second set of alternate strips disposed between said first strips.

23. The apparatus as set forth in claim 22 wherein said means for forming the adhesively bonded stacks of strips includes means for advancing each sheet with said glue spots applied to the top and bottom facing thereof and cooperative star folding means wherein the sheet is progressively star folded into an accordion stack-up so as to bring the glue spots of each strip into contact with a juxtaposed bare portion of the opposite facing of the juxtaposed strip as the same are compressed together in an accordion fold stack-up.

24. The apparatus as set forth in claim 23 further including means for removing the interconnecting uncut portions in said sheet material comprising sanding means and means for passing each accordion folded stack of adhesively bonded strips of the sheet material through said sanding means, said sanding means being operable to dress the opposite folded edges of said strip stack-up to a finish depth sufficient to remove enough edge material to also remove said uncut connecting portions exposed at said edges of the stack-up.

* * * * *